United States Patent [19]
Björklund et al.

[11] 3,998,103
[45] Dec. 21, 1976

[54] METERING APPARATUS AND METHOD

[76] Inventors: Knut Bertil Björklund; Knut Johan Björklund; Tom Bertil Björklund, all of Appelviksvagen 26, 161 36 Bromma, Sweden

[22] Filed: Nov. 20, 1974

[21] Appl. No.: 525,302

[30] Foreign Application Priority Data
Nov. 23, 1973 Sweden .......................... 7315920

[52] U.S. Cl. .............................. 73/425.6; 222/212; 222/215
[51] Int. Cl.² ...................... B01L 3/02; G01N 1/14
[58] Field of Search ................... 417/53, 474–478, 417/502, 503; 23/259; 73/425.6; 141/25, 67; 222/1, 212–215

[56] References Cited
UNITED STATES PATENTS

| | | | |
|---|---|---|---|
| 2,351,828 | 6/1944 | Marsh | 417/474 |
| 3,606,596 | 9/1971 | Edwards | 417/474 |
| 3,681,030 | 8/1972 | Natelson | 73/425.6 |
| 3,888,125 | 6/1975 | Mochida | 73/423 A |

*Primary Examiner*—S. Clement Swisher
*Attorney, Agent, or Firm*—Gordon W. Hueschen

[57] ABSTRACT

An elastic tube, having an inlet end adapted to communicate with liquid to be metered incrementally and an outlet end connected to a discharge nozzle having an orifice, is arranged to be collapsed at inlet, outlet and intermediate positions (at least three positions) in a programmed cycle such that liquid is trapped in the intermediate position between collapsed inlet and outlet positions, thereby determining the size of the increment. Air is drawn in through the nozzle upon unloading the inlet position, thereby to suck in any liquid which may have accumulated at the nozzle and thus to prevent any inadvertent dropping off of liquid from the nozzle. The liquid is then discharged through the nozzle by collapsing the intermediate and outlet positions in succession, and liquid is drawn in through the inlet end upon unloading the inlet and intermediate positions, thereby starting the cycle over.

11 Claims, 7 Drawing Figures

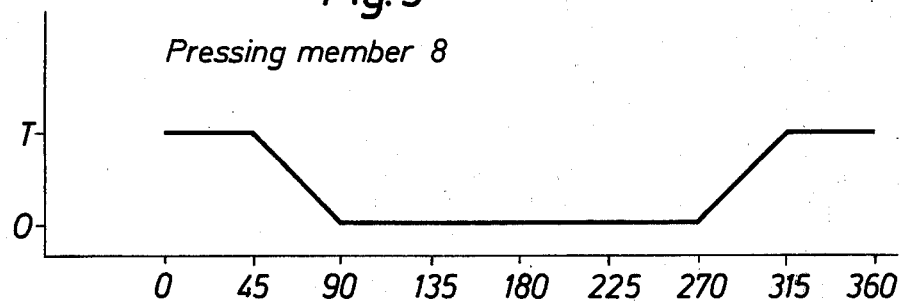
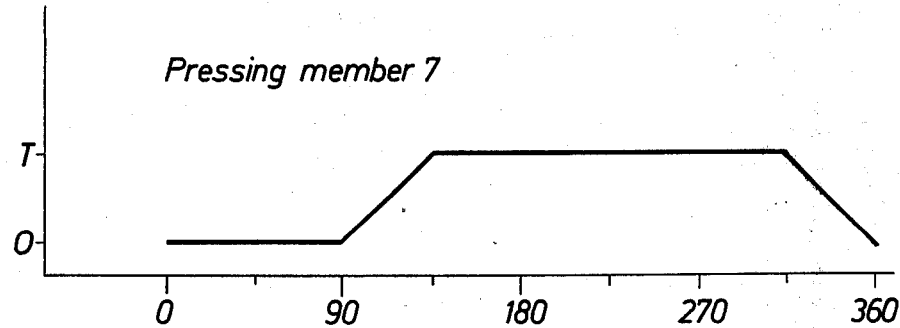
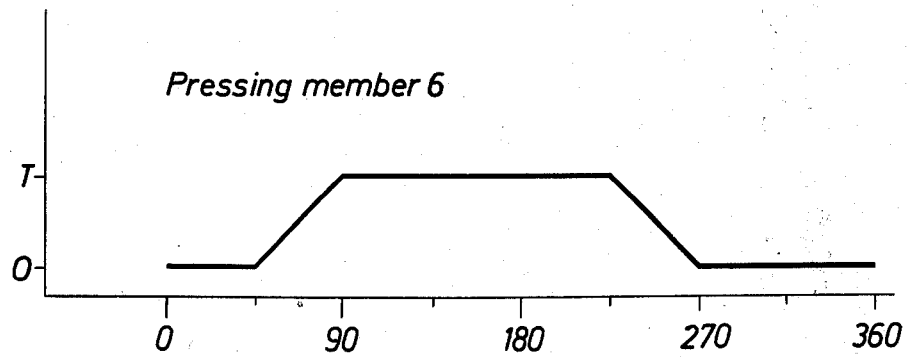

METERING APPARATUS AND METHOD

BACKGROUND OF INVENTION

1. Field of Invention

The invention relates to method and apparatus for metering liquid in incremental amounts which are designed precisely to determine the size of each increment, thereby accurately to measure out the liquid. Such method and apparatus is especially valuable for laboratory work, during which it is often desirable to incrementally feed small amounts, say of the magnitude of some ten microliters or so, of a liquid to a collecting vessel or to samples, for example, in order to make a titration or in order to bring materials together for reaction, it being desirable to be able to feed on the order of one thousand part volumes or increments per hour.

2. Prior Art

Apparatus for the incremental feeding of a liquid are known, but have for different reasons shown themselves to be not particularly suitable for this purpose.

One such device comprises a dosage syringe to which a manifold is fitted, this manifold having a number of exiting narrow tubes which are intended to convey equal amounts of the liquid to a corresponding number of samples. It is, however, difficult to achieve a uniform flow resistance in the different tubes, which furthermore tend to become stopped up by particles in or precipitations from the liquid conveyed, because of which the flow varies considerably in the different tubes.

Another known device comprises a vessel to which a number of elastic tubes are connected. The liquid in the vessel is actuated by a pressurized gas, for example nitrogen, in order to be driven out into the tubes, and the tubes are pressed together and opened parallelly in order to let desired equal amounts of liquid pass through the tubes. However, in such device the gas tends to dissolve in the liquid, which makes the device unsuitable for use in many applications.

A third known device comprises a number of pipettes having needle-like drop-forming means, the drop-forming velocity being controlled by an air filter at the inlet of the pipette, and the drop size being determined by the design of the needle. This device is, however, very sensitive to vibrations, and it is also difficult to adapt to different desired sample flows and liquid volumes.

Moreover, pumping devices are known which comprise an elastic hose, which is actuated by pressure means, such as the devices shown for example in U.S. Pat. Nos. 2,105,200, 2,393,898, 2,412,397 and 2,689,530. These known devices have been proposed for various kinds of pumping, but the special advantages allegedly achievable by driving such devices in accordance with the invention have not been obtained up to the present.

OBJECTS

It is therefore an object of the present invention to provide a method and apparatus for metering liquids in accurate and precise increments. A further object of the invention is to provide a method and apparatus according to the invention in which inadvertent dripping is avoided. Still another object is to avoid the disadvantages of the prior art and to obtain such advantages as will appear as the description proceeds.

SUMMARY OF THE INVENTION

According to the present invention, the disadvantages of known apparatuses and methods are avoided and the objects of the invention are achieved by admitting the liquid to be metered to fill a collapsible chamber having inlet, outlet and intermediate collapsible positions, collapsing the inlet and outlet positions thereby to trap a determined increment of liquid in the intermediate position between the collapsed inlet and outlet positions, unloading the outlet position and expanding the same while it is in communication with the atmosphere through a discharge nozzle having an orifice, thereby to suck in air through said nozzle and into said chamber, whereby any liquid which may have accumulated in said nozzle or at the orifice thereof is sucked back toward the chamber, and thereafter collapsing the intermediate and outlet positions to discharge through said nozzle a precisely determined increment of liquid.

Suitably the collapsible chamber is an elongated elastic tube having good form recovery properties and adapted to be collapsed as it is loaded and unloaded by pressing members at inlet, outlet and intermediate positions (at least three positions) along its length and operating in a programmed cycle, comprising: beginning with the chamber filled with liquid and the inlet and outlet positions closed, whereby a determined quantity of liquid is trapped in the chamber; unloading the outlet position with the nozzle exposed to the atmosphere, whereby air is sucked in through the nozzle; collapsing the intermediate and outlet positions, whereby liquid contained in the chamber is ejected through the nozzle; unloading the inlet and intermediate positions to draw in liquid, and collapsing the inlet position to reestablish the condition in which a determined quantity of liquid is trapped in the chamber.

It will be observed that the tube is kept collapsed at all times in at least one pressing or collapsing position whereby the flow is positively controlled, that is, the liquid can flow through the tube only if the collapsing and unloading cycle is carried out in the indicated and desired manner.

In an apparatus according to the invention, it is of course possible to pump liquid through a plurality of preferably parallelly arranged tubes, if only the pressing means are made so wide that they cover all of these tubes.

The metering device according to the invention can also be used to separately, in predetermined and possibly different increments, feed different substances into contact with each other for reaction, admixing, or the like, i.e., the exiting tubes can be joined to a mixing chamber from which the admixture or reaction product leaves batchwise in concert with feeding by the pump of a new round of increments of different substances to the reaction chamber.

The movements of the pressing means can be achieved in several ways. As will be more fully described hereinafter, the pressing means may be arranged on axially displaceable and guided rods, which are actuated by rotating cams, which according to their shape determine the programming of the cycle. One can, however, also arrange the pressing means at hydraulic or pneumatic actuated cylinder-piston units, the movements of which can be controlled by logic circuits (programming circuity) as known in the art.

It is also possible to comprise the pressing members of rotating cams or cam plates, which during rotation directly engage the tube, the axis of rotation of said cams or cam plates being advantageously arranged parallel to the tube.

The tube used in the device according to the invention need only be elastic at said pressing positions and may there consist of some type of rubber or elastomer, which has the desired elastical properties and resistance against the fluids to be metered. In cases when the pumping liquid is to be sucked into the pump, the tube must have a good form recovery (plastic memory) at least at the outlet pressing positions, but it is also possible to feed the liquid to the pump under pressure such that it expands the tube during the feeding-in step. In the last-mentioned case, it is possible to use a tube which maintains a constant inner circumference and which is deformable, for example, a thin-walled tube of a material which is non-stretchable. If the tube does not have good form recovery at the outlet position, some other means of expanding it at this position should be provided in order effectively to have air sucked through the nozzle.

The device and the method according to the invention is primarily suitable for metering small increments of liquid, for example, 25–50 microliters.

It is moreover relatively simple to vary the volume of the increment by changing tube dimensions in such a device according to the invention. In a device having more or less parallel tubes, this provides a simple way to obtain varying increments.

BRIEF DESCRIPTION OF THE DRAWINGS

In the drawings:

FIG. 5 is a plurality of curves showing the programming of the pressing members.

DESCRIPTION OF THE PREFERRED EMBODIMENTS

Figure 1:
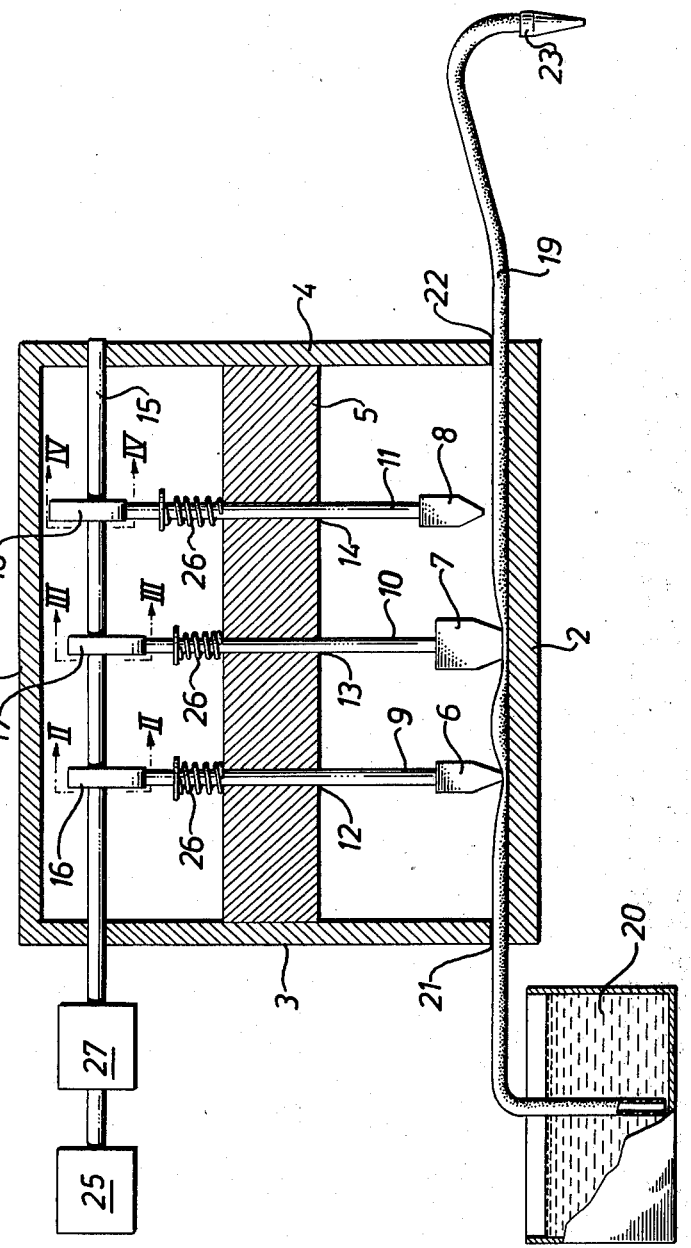
FIG. 1 is a longitudinal section of apparatus according to the invention.

The metering apparatus according to FIG. 1 has a frame comprising an upper member 1, a bottom member 2 and side members 3 and 4. A guide block 5 is arranged between the side members 3 and 4. The pressing members 6, 7 and 8 are fitted at the push rods 9, 10 and 11, respectively, which are guided in apertures 12, 13 and 14 respectively, in the block 5. The apertures and the rods have a shape such that rotation of the rods is avoided. A cam shaft 15 is rotatably mounted in the side members 3, 4 above the rods 9, 11 in the plane through the rods, and is provided with cams 16, 17 and 18, which cooperate with the rods 9–11, respectively.

The tube 19, which at its inlet end communicates with a source of liquid 20, is pulled through openings 21, 22 in the side members 3 and 4, respectively, and rests on the bottom member 2 under the pressing members. Due to its elasticity and form recovery characteristics, the tube 19 lifts the pressing members 6–8 upwards such that their rods 9–11 at all times engage the cams 16–18. If desired, however, the function can be achieved or supplemented by the springs 26 arranged to maintain rods 9–11 pushed upwardly against the cams 16–18. The outlet end of the tube 19 is provided with a nozzle 23, the point of which is narrow and elongated and the orifice of which has a small sectional area. By such means the exhausted liquid achieves high velocity, whereby the tendency of forming of drops at the nozzle orifice is reduced. This has a substantial significance when the device according to the invention is used for pumping increments of the magnitude of 10–200 microliters, if one considers that around 50 microliters correspond to one drop of water.

Figure 2:
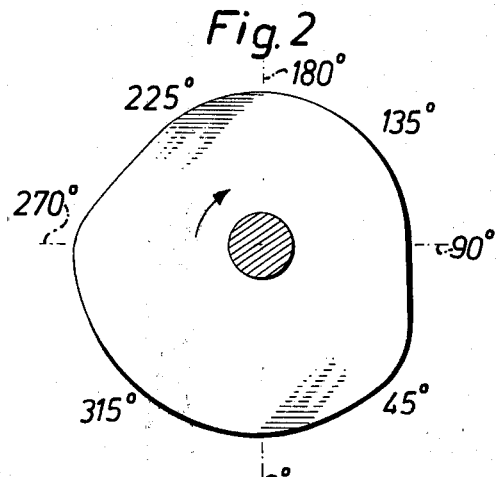
FIGS. 2–4 are partial side elevations taken respectively along lines II—II, III—III and IV—IV.
Figure 3:
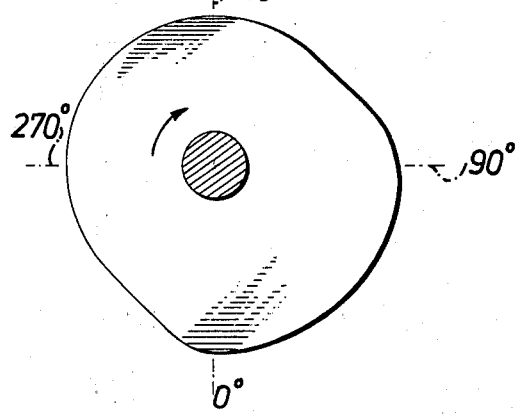
Figure 4:
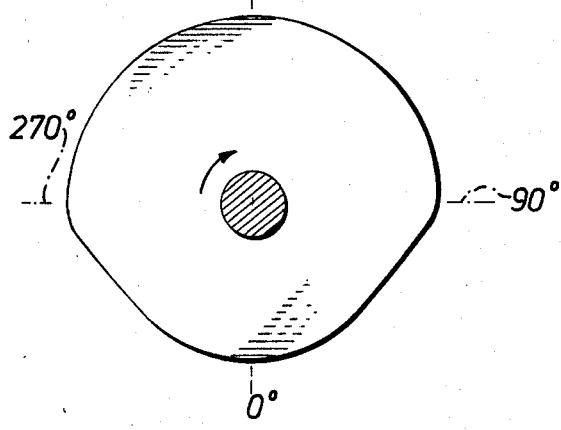

FIGS. 2, 3 and 4 show the shape of the cams 16, 17 and 18, respectively, the cams being oriented for the pressing member position shown in FIG. 1, wherein the marking 0° refers to that point on each cam which engages the corresponding rod. The cam shaft 15 is intended to be rotated clockwise as seen from the left part of FIG. 1, for example by means of a motor 25, to transport liquid from the left to the right in the tube 19. The rotational direction of the cam discs is indicated by arrows in FIGS. 2–4.

The cam shaft 15 is driven by means of a motor 25 via a coupling 27. This coupling is of the type that at actuation meets the motor 25 to rotate the shaft 15 one revolution or a rotational angle corresponding to one outspraying and insucking cycle. In this manner the operator is given plenty of time to transfer the nozzle as the need arises.

The vertical movement given to the rods and their pressing members by the cams is illustrated in FIG. 5, wherein T refers to the upper end position and O to the lower end position. These end positions are plotted for the different angular positions of the cams 16, 17 and 18, respectively, from 0° – 360°, FIG. 1 showing the position 0° or 360°.

It should be noted that the insucking phase has a relatively long duration whereas the outspraying phase has a relatively short duration. For example, the insucking as seen by FIGS. 2–5 begins at 90° and ends at 270°, whereas the ejection or outspraying begins at 0° and ends at 90°. In this manner, the tube is given a sufficient time to recover its shape in order to thereby suck in liquid and, in addition, a sufficient time margin is achieved between each increment ejected, whereby more time is available to shift recovery vessels. These advantages are achieved despite the fact that the cam shaft is continuously rotating.

If one desires to use other driving means, for example hydraulic or pneumatic cylinders, for the pressing members, it is entirely possible to use the diagram shown in FIG. 5 to control the drive means.

Even if the movement pattern shown in FIG. 5 is preferred, it should be appreciated that this pattern can be varied in numerous ways without departing from the concept of the present invention. If desired during a pumping cycle, one can for example prolong the sucking-in step and shorten the outfeeding step by simple modifications of the guiding curves according to FIG. 5 or the cam discs according to FIGS. 2–4.

From FIG. 5 it can be seen that the phase position 315° is essential for the invention in that the pressing member 8 is there unloaded for a moment, which causes the air, which is then sucked-in, to bring or return the small drops which may have gathered at the edge of the nozzle 23 back into the nozzle. Because of the narrowness of the nozzle orifice, a high air velocity is achieved, and this simplifies the sucking away of the droplets.

The device according to the invention is primarily intended for increments of volumes of the magnitude of 25 microliters, and it is therefore to be appreciated that a single drop gathered at the nozzle orifice could introduce an error of more than 100% in the increment, should it fall off simultaneously with the outfeeding of an increment.

The dimension of the nozzle orifice may be adapted to the properties of the liquid being metered, the minimum section area being determined by the pressure one is willing to allow in the tube, while the maximum cross-section is determined by the risk that the liquid will flow out by gravity.

Figure 6:
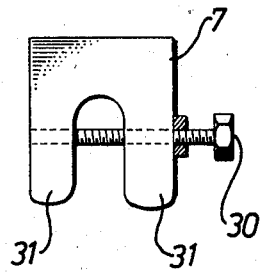
FIGS. 6 and 7 are partial side elevations of modified forms of the pressing members.

In order to make it possible to adjust the pressing member 8 for different desired displacement volumes, the pressing member may be U-shaped as shown in FIG. 6 and provided with an adjustment screw 30, which permits setting of different distances between the legs 31 of the pressing member.

Figure 7:
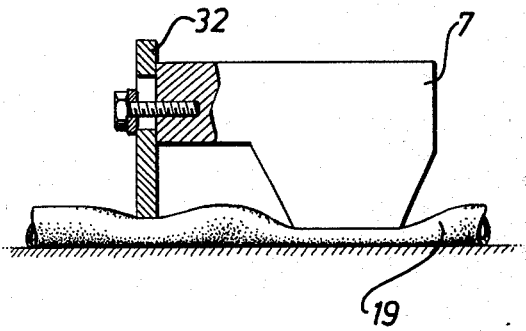

In case one wishes to calibrate the displacement volume or compensate said volume for form changes of the tube at the pressing position, one can as shown in FIG. 7 arrange an adjustment flange 32, at the pressing member, said flange being adjustable with relation to the pressing member toward or away from the tubing. A displacement of the flange 32 gives a very small alteration of the displacement volume in relation to the displacement distance.

The device disclosed can be modified in a number of ways within the scope of the invention. The device shown in FIG. 1 can thus be turned upside down which makes the springs 26 unnecessary. It is also possible to use the elastical form recovery of the tube to lift the pressing members. Furthermore, the pressing members may be changeable, so that one can simply change displacement volume. Further, the movement pattern shown in FIG. 5 may be varied in numerous ways, the essential thing being the order in which the pressing members are driven, and that a small resucking is achieved at the end of each sequence.

It is to be understood that the invention is not to be limited to the exact details of operation or structure shown and described, as obvious modifications and equivalents will be apparent to one skilled in the art.

We claim:

1. A method for accurately metering a liquid in precise increments which comprises admitting liquid to fill a chamber having inlet, outlet and intermediate collapsible positions, collapsing the inlet and outlet positions thereby to trap a determined increment of liquid in the intermediate position between the collapsed inlet and outlet positions, unloading the outlet position and expanding the same while it is in communication with the atmosphere through a discharge nozzle having an orifice thereby to suck in air through said nozzle into said chamber whereby any liquid which may have accumulated in said nozzle or at the orifice thereof is sucked back toward said chamber, and thereafter successively collapsing the intermediate and outlet positions to discharge through said nozzle a precisely determined increment of the liquid.

2. A method of claim 1 in which the collapsible chamber is an unbranched elongated elastic tube with form recovery having an inlet end in communication with the liquid to be metered and an outlet end connected to the nozzle and in which the collapsing and unloading is effected in the following cycle of steps, beginning at the stage wherein the chamber is filled with liquid and the inlet and outlet positions are collapsed:
   1. unloading the outlet position to draw in air,
   2. collapsing the intermediate and outlet positions to eject the liquid, and unloading the inlet and intermediate positions to draw in liquid, and
   3. collapsing the inlet position to re-establish the beginning stage.

3. The method of claim 2 in which the drawing in step is of longer duration than the ejecting step.

4. Apparatus for metering liquids which comprises a collapsible chamber having inlet, outlet and intermediate collapsing positions and its inlet end arranged to communicate with the liquid to be metered and its outlet end connected with a discharge nozzle having an orifice, and means for collapsing and unloading said chamber, which is programmed to trap a determined quantity of liquid in the intermediate unload position between the collapsed inlet and outlet positions, to unload and expand the outlet position to draw in air through the discharge nozzle, to sequentially collapse the intermediate and outlet positions to eject the liquid, to unload and expand the inlet and intermediate positions to draw in a new increment of liquid, and to collapse the inlet position thereby to trap an accurately determined quantity of liquid in said chamber.

5. The apparatus of claim 4 in which the collapsible chamber is an unbranched elongated elastic tube having an inlet end adapted to communicate with the liquid to be metered and an outlet end connected with the discharge nozzle, and pressing members located at the inlet, outlet, and intermediate collapsing positions arranged to press the tubing against a base member to collapse and unload the tubing at the respective collapsing positions and adapted to be driven by driving means.

6. The apparatus of claim 5 in which the driving means comprises a rotatably journaled drive shaft which is provided with cam discs which actuate power transmission means connected with the pressing members.

7. The apparatus of claim 5, characterized in that the pressing members are arranged to be lifted by means of the return spring of the tube.

8. The apparatus of claim 5, characterized in that the drive means comprises cylinder units, which are directly connected to the pressing members in order to lift and lower them in predetermined sequence.

9. The apparatus of claim 6, characterized in that the transmission means comprises axially-guided rods.

10. The apparatus of claim 5 in which a pressing member is U-shaped and provided with means for setting of different distances between the legs of the U-shaped pressing member.

11. The apparatus of claim 5 in which a pressing member comprises an adjustment flange which is adjustable with relation to the pressing member toward or away from the tubing.

* * * * *